United States Patent [19]

Futami

[11] Patent Number: 5,258,678
[45] Date of Patent: Nov. 2, 1993

[54] ROTATOR ELEMENT FOR ELECTRIC MOTOR

[75] Inventor: Toshihiko Futami, Kanagawa, Japan

[73] Assignee: Kabushiki Kaisha Toshiba, Kawasaki, Japan

[21] Appl. No.: 909,063

[22] Filed: Jul. 2, 1992

[30] Foreign Application Priority Data

Jul. 5, 1991 [JP] Japan .............. 3-052134[U]

[51] Int. Cl.$^5$ .................................. H02K 21/12
[52] U.S. Cl. ................................ 310/156; 29/598
[58] Field of Search ............ 310/156, 218, 42, 261, 310/268, 216; 29/598

[56] References Cited

U.S. PATENT DOCUMENTS

| | | | |
|---|---|---|---|
| 4,137,884 | 2/1979 | Odazima et al. | 310/156 X |
| 4,855,630 | 8/1989 | Cole | 310/156 |
| 4,973,872 | 11/1990 | Dohogne | 310/156 |

FOREIGN PATENT DOCUMENTS

| | | | |
|---|---|---|---|
| 0459355 | 12/1991 | European Pat. Off. | 310/156 |
| 60-109749 | 6/1985 | Japan . | |
| 63-80744 | 4/1988 | Japan . | |
| 0185155 | 7/1989 | Japan | 310/156 |

*Primary Examiner*—Emanuel T. Voeltz
*Attorney, Agent, or Firm*—Limbach & Limbach

[57] ABSTRACT

A rotator element for an electric motor is formed with a cylindrical core body which is to be rotated by a rotary field produced by a winding of the electric motor and plurality of magnets. The core body is made of stacked disc-shaped plates, each of which has a cutout portion arranged on its circumference areas so as to form a hole through said core body when the plates are stacked. The core body has a thin wall portion provided on its circumferential surface facing said winding, wherein a part of the wall portion is projected to said hole. The permanent magnets inserted in the holes are firmly fixed by the projected portion.

4 Claims, 2 Drawing Sheets

ROTATOR ELEMENT FOR ELECTRIC MOTOR

BACKGROUND OF THE INVENTION

1. Field of the Invention

The present invention relates to a rotator element for an electric motor. More specifically, the present invention relates to a rotator element for an electric mortor having improved fixing structure of permanent magnets.

2. Description of the Related Art

In the Japanese Patent Disclosure 60-109749, a permanent magnet type of rotator element for an electric motor is disclosed. In such type of rotator element, a plurality of permanent magnets are fixed in holes provided at a cylindrical core body of the rotator. The core body is generally made of stacked iron disc-shaped plates. Each of the disc-shaped plates has a plurality of cutouts on the circumference areas. The permanent magnets with opposite pole are alternately inserted into the holes as shown in the Patent Disclosure 60-109749. The core body has a central hole through which a rotator-shaft is inserted. The core body has small holes to fasten the disc-shaped plates together by rivets. Two of the disc-shaped plates located at the outermost sides, which have no cutout portions, are plates for holding the rest of ring-shaped plates together with the rivets.

Due to the difficulties in manufacturing the accurate size of permanent magnets, dimensional tolerance is given to ±0.1 mm for instance. Accordingly, some of the permanent magnets cause an insertion problem. The permanent magnet which is in the uppermost limit of the tolerance may fail to be insertable into the hole because the hole is smaller than the magnet. By forcibly inserting such permanent magnet into the hole, it would be broken or deformed. On the other hand, the permanent magnet which is in the lowermost limit of the tolerance causes another problem. In this instance, the permanent magnet is vibrated in the hole during the rotation of the rotator and generates vibration noise. This vibration could cause the permanent magnet to break.

SUMMARY OF THE INVENTION

Accordingly, it is an object of the present invention to provide a rotator element for an electric mortor which has an improved fixing structure for the permanent magnets.

To accomplish the above object, there is provided a rotator element for an electric motor comprising:

a core body, which is to be rotated by a rotary field produced by a winding of the electric motor, the core body including stacked disc-shaped plates, each of the plates having a cutout portion arranged on its circumference areas so as to form a hole through the core body when the plates are stacked, the core body having a thin wall portion provided on its circumferential surface facing the winding, wherein a part of the wall portion is projected to the hole; and a plurality of permanent magnets fixed to said core body, the permanent magnets with opposite pole alternately being inserted in the holes, wherein each of the permanent magnets is fixed by the projection.

BRIEF DESCRIPTION OF THE DRAWINGS

The accompanying drawings illustrate a preferred embodiment of the invention.

DETAILED DESCRIPTION OF THE PREFERRED EMBODIMENT

Figure 1:
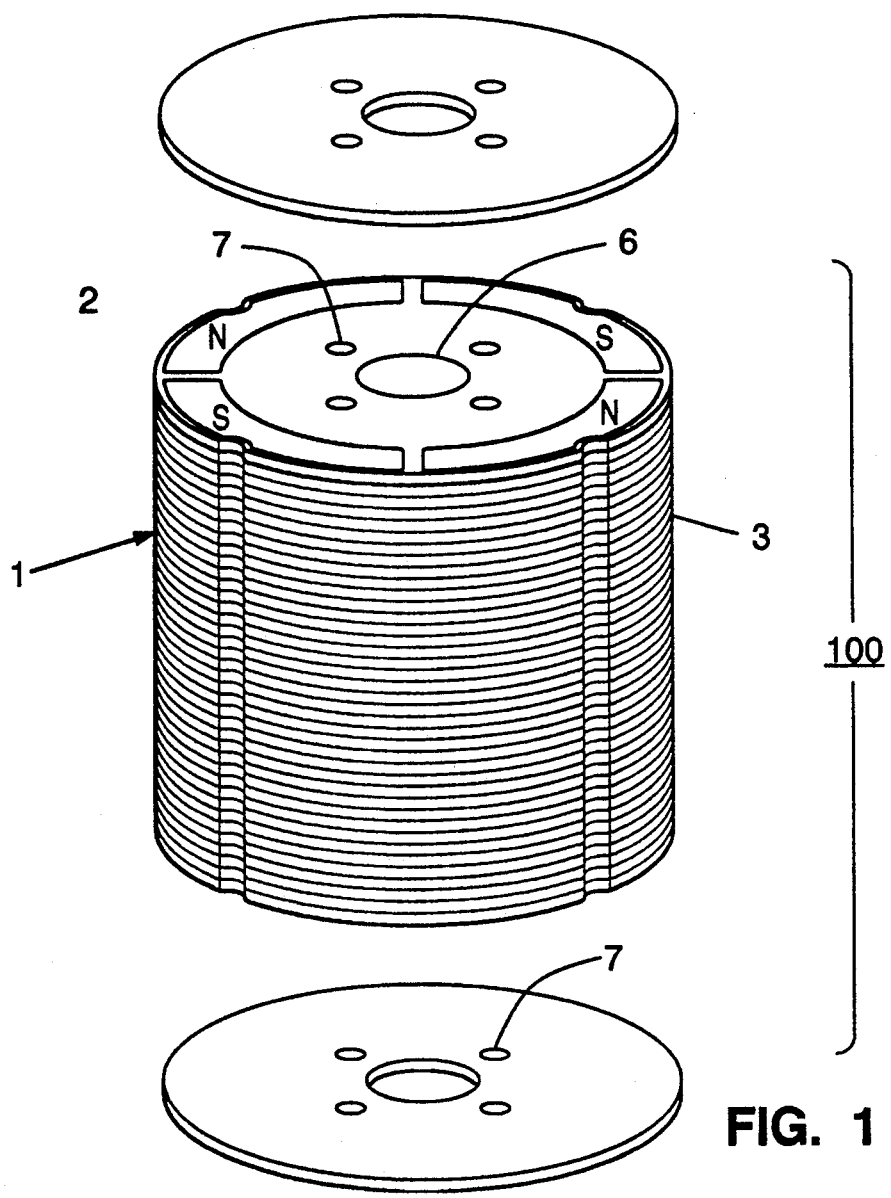
FIG. 1 shows a rotator element according to the present invention.
Figure 2:
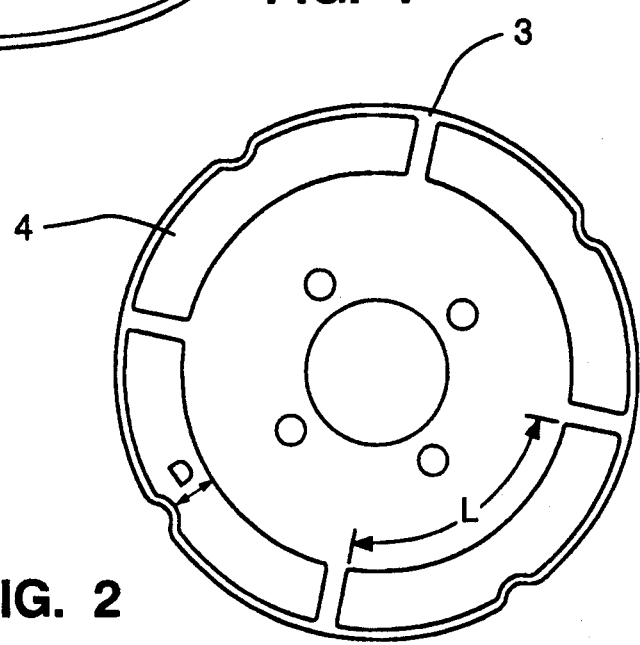
FIG. 2 shows a view of a disc-shaped plate.
Figure 3:
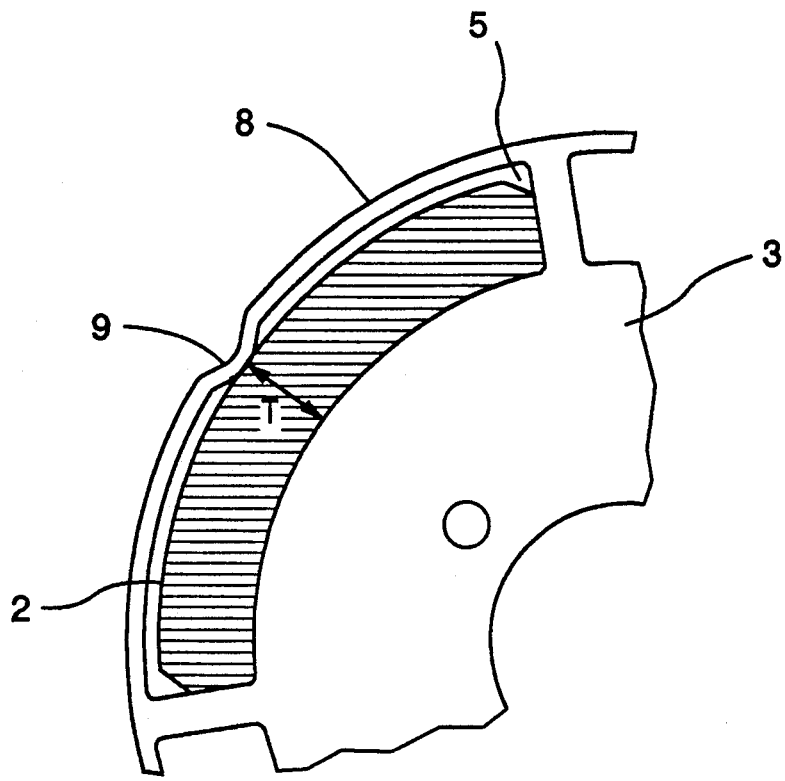
FIG. 3 shows an enlarged partial view of a core body shown in FIG. 1.
Figure 4:
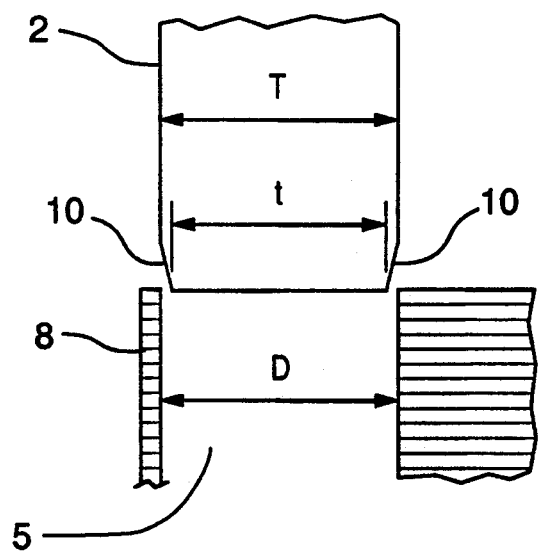
FIG. 4 shows an explanatory view of the core body shown in FIG. 1.

FIG. 1 shows a rotator element 100 of an electric motor according to the present invention. Rotator element 100 is assembled with a cylindrical core body 1 and four permanent magnets 2. Core body 1 is formed with stacked disc-shaped iron plates 3. Each disc-shaped plate 3 has four cutout portions 4 on the circumference areas as shown in FIG. 2. Cutout portions 4 are obtained by a conventional punching method. Disc-shaped plates 3 are so stacked to form cylindrical core body 1 with four holes 5. The circumferential surface of cylindrical body 1 is to be faced to windings of a stator (not shown) of the electric motor. Permanent magnets 2 with different pole are alternately inserted into holes 5. In the center of core body 1, a central hole 6 for fixing a rotator shaft (not shown) is provided. Stacked plates 3 are fastened by rivets (not shown). Numeral 7 indicates holes for rivets. The length (L) of each cutout portion 4 is so designed that permanent magnet 2 which is in the uppermost limit of the dimensional tolerance can be smoothly inserted to hole 5. As clearly shown in FIG. 4, a thin wall portion 8 is formed on the surface of cylindrical core body 1. A part of thin wall 8 is deformed or projected so that the inner distance (D) of each opening 5 is less than the width (T) of permanent magnet 2 which is in the lowermost limit of the dimensional tolerance. Numeral 9 indicates projected portions. In order to enhance the smooth insertion of magnets 2, cutaway portions 10 are provided on at least one end of permanent magnets 2 as shown in FIG. 4. Accordingly, the width(t) of magnet 2 with cutaway portion 10 is shorter than the width(T) of magnet 2 with non-cutaway portion.

Explanation on insertion of permanent magnets 2 into holes 5 of cylindrical core body 1 will be described.

First of all, one end of permanent magnet 2 where cutout portion 4 is provided is inserted to hole 5. Permanent magnet 2 is easily inserted because the inner distance (D) is larger than the width(t) of permanent magnet 2 with cutaway portion 10. Cutaway portion 10 slides on projected portion 9 of thin wall 8. Projected portion 9 is then forced to move outwardly by magnet 2 with non-cutaway portion while magnet 2 goes inside hole 5. The outward movement reacts to secure permanent magnet 2 firmly with projected portion 9. As described above, length (L) of each cutout portion 4 is so designed that permanent magnet 2 which is in the uppermost limit of the dimensional tolerance can be smoothly inserted to hole 5.

Accordingly, the embodiment of the present invention can perform smooth insertion of permanent magnets 2 into holes 5 of cylindrical core body 1, but it can also realize the excellent fixing structure of permanent magnets 2. Further, the embodiment can prevent permanent magnets 2 from being broken or deformed. As shown in FIG. 1, four lines, each of which corresponds to one magnet 2 are formed the circumferential surface of cylindrical body 1, however, the number of lines is not limited to four. Two lines for each magnet 2 is acceptable. A disc-shaped plate with such projection is obtainable by a punching method.

The present invention has been described with respect to a specific embodiment. However, other embodiments based on the principles of the present invention should be obvious to those ordinary skill in the art. Such embodiments are intended to be covered by the claims.

What is claimed is:

1. A rotator element for an electric motor comprising:

a cylindrical core body, which is to be rotated by a rotary field produced by a winding of the electric motor, said core body including stacked disc-shaped plates, each of said plates having a cutout portion arranged on its circumference areas so as to form a hole through said core body when said plates are stacked, said core body having a thin wall portion provided on its circumferential surface facing said winding, wherein a part of said wall portion is projected within said hole; and a plurality of permanent magnets each having an inner and outer circumferential surface and side surfaces fixed to said core body, said permanent magnets with opposite poles alternately being inserted in said holes, and wherein each of said permanent magnets are fixed in place by engagement of said projected portion with said outer circumferential surface thereof.

2. A rotator element for an electric motor according to claim 1, wherein said permanent magnet includes a cutaway portion provided on at least one end thereof.

3. A rotator element for an electric motor according to claim 2 wherein said projected portion forms a line on said thin wall.

4. Method for manufacturing a rotator element for an electric motor, which comprises:

preparing disc-shaped plates, each of said plates having a cutout portion arranged on its circumference areas;

stacking said disc-shaped plates to form a cylindrical core body which is to be rotated by a rotary field produced by a winding of the electric motor and to form a hole through said core body with said cutout portions, wherein said cylindrical core body has a thin wall portion provided on its circumferential surface facing said winding;

projecting a part of said thin wall portion within said hole; and inserting a plurality of permanent magnets into said holes and fixing said permanent magnets within said cylindrical core body by engagement of said projected part of said thin wall with the outer surface of each of said permanent magnets.

* * * * *